(12) United States Patent
Jourdan et al.

(10) Patent No.: US 6,721,849 B2
(45) Date of Patent: *Apr. 13, 2004

(54) FRONT END SYSTEM HAVING MULTIPLE DECODING MODES

(75) Inventors: Stephan J. Jourdan, Portland, OR (US); Alan Kyker, Davis, CA (US)

(73) Assignee: Intel Corporation, Santa Clara, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 10/377,716

(22) Filed: Mar. 4, 2003

(65) Prior Publication Data

US 2003/0131195 A1 Jul. 10, 2003

Related U.S. Application Data

(63) Continuation of application No. 09/742,410, filed on Dec. 22, 2000, now Pat. No. 6,564,298.

(51) Int. Cl.[7] .............................................. G06F 12/00
(52) U.S. Cl. ...................... 711/125; 711/125; 711/137; 711/141; 711/213; 711/220
(58) Field of Search ................................. 711/125, 137, 711/141, 213, 220, 118; 712/123, 210

(56) References Cited

U.S. PATENT DOCUMENTS

| | | | |
|---|---|---|---|
| 5,075,840 A | | 12/1991 | Grohoski et al. ............ 712/216 |
| 5,499,350 A | | 3/1996 | Uchida et al. .............. 712/220 |
| 5,642,493 A | * | 6/1997 | Burgess ...................... 711/116 |
| 5,689,672 A | * | 11/1997 | Witt et al. ................... 712/213 |
| 5,761,473 A | | 6/1998 | Kahle et al. ................. 712/206 |
| 5,764,938 A | * | 6/1998 | White et al. ................. 712/200 |
| 5,790,822 A | * | 8/1998 | Sheaffer et al. ............. 712/200 |
| 5,881,260 A | * | 3/1999 | Raje et al. ................... 712/210 |
| 5,918,245 A | * | 6/1999 | Yung ........................... 711/122 |
| 5,923,612 A | | 7/1999 | Park et al. ................... 424/401 |
| 5,930,830 A | * | 7/1999 | Mendelson et al. ......... 711/170 |
| 5,991,863 A | * | 11/1999 | Dao et al. .................... 711/219 |
| 6,073,213 A | * | 6/2000 | Peled et al. .................. 711/125 |
| 6,175,930 B1 | * | 1/2001 | Arimilli et al. .............. 709/248 |
| 6,308,257 B1 | * | 10/2001 | Theogarajan et al. ....... 712/210 |
| 6,460,116 B1 | * | 10/2002 | Mahalingaiah .............. 711/125 |
| 6,564,298 B2 | * | 5/2003 | Jourdan et al. ............. 711/125 |

OTHER PUBLICATIONS

Intrater, et al., "Performance Evaluation of a Decoded Instruction Cache for Variable Instruction–Length Computers", © 1992 ACM, p. 106–113.*

* cited by examiner

*Primary Examiner*—Donald Sparks
*Assistant Examiner*—Brian R. Peugh
(74) *Attorney, Agent, or Firm*—Kenyon & Kenyon

(57) ABSTRACT

Embodiments of the present invention provide a pre-decoder in a front-end system provided between an instruction cache and a decoder. The front-end system may toggle between two modes of operation. In a first mode, called the "fast mode" the front-end system retrieves pre-decoded instructions from the instruction cache and decodes them directly. In a second mode, called the "marking mode," the front-end system retrieves data from the instruction cache and synchronizes to them prior to decoding. Synchronization results may be stored back in the instruction cache for later use.

39 Claims, 4 Drawing Sheets

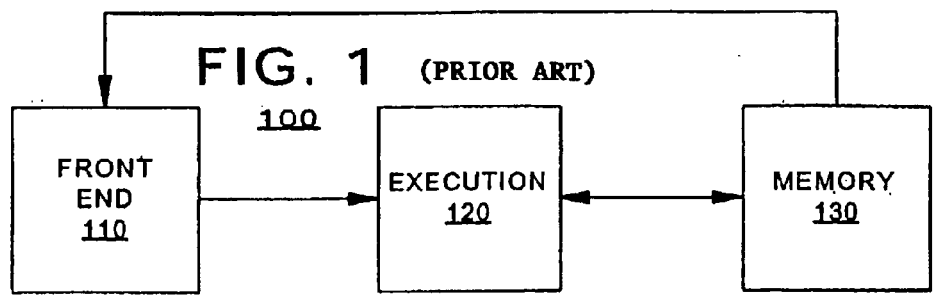
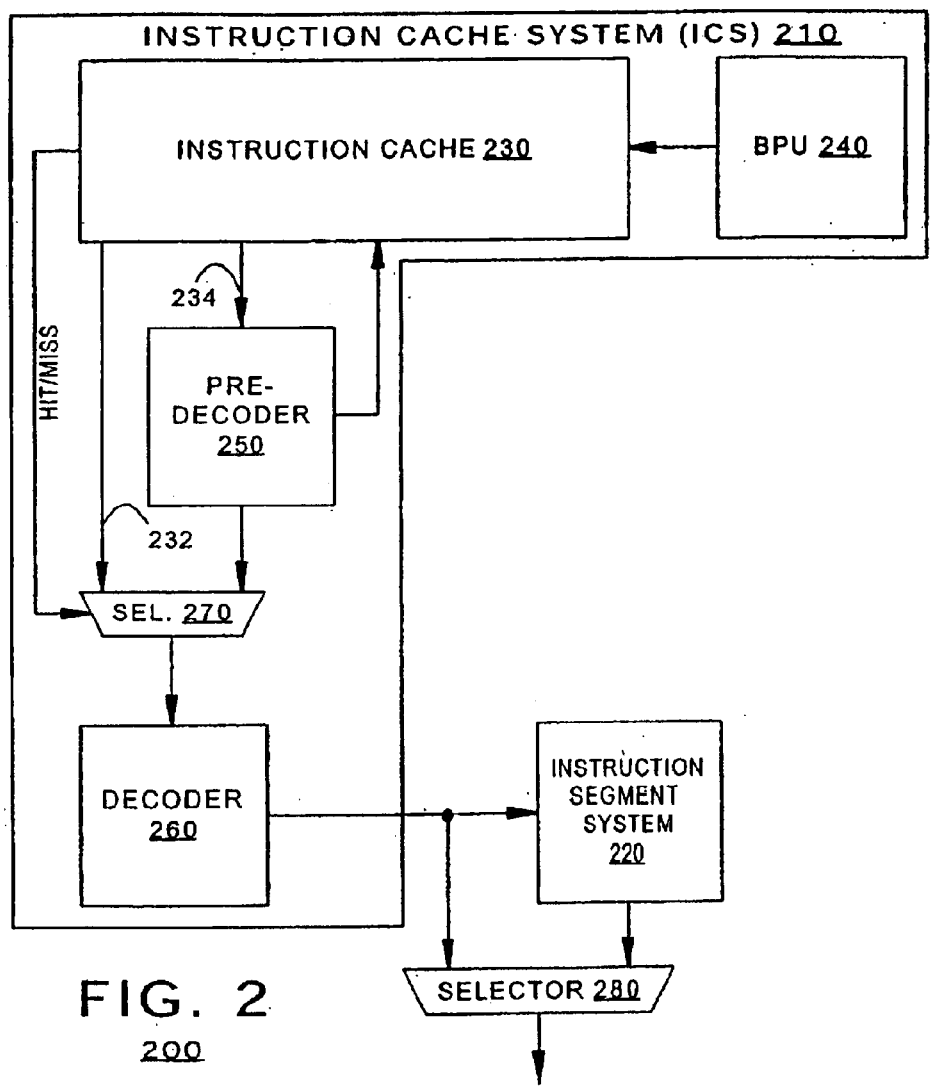

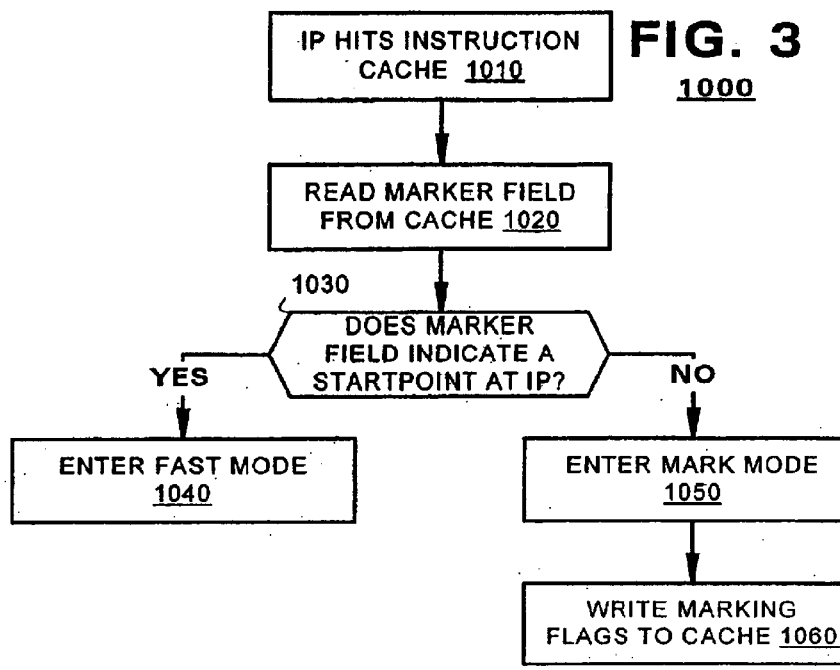
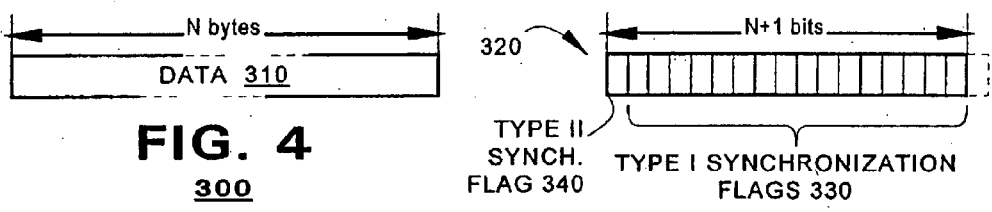
FIG. 4
300
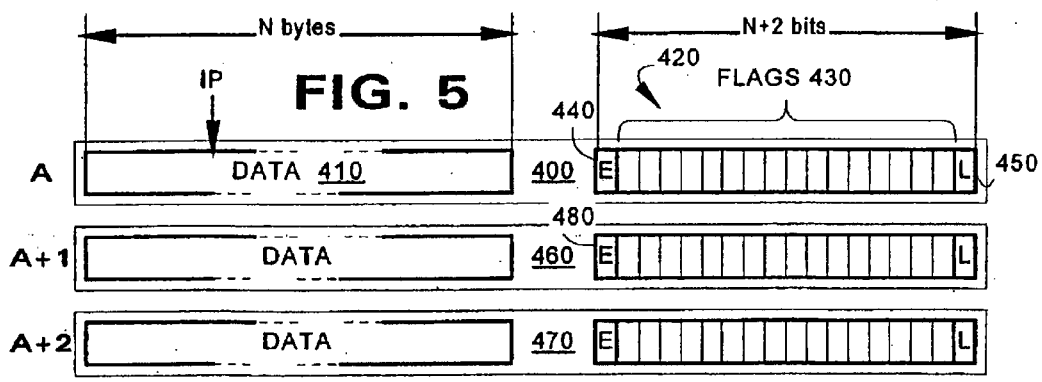
FIG. 5

1100

FRONT END SYSTEM HAVING MULTIPLE DECODING MODES

CROSS-REFERENCE TO RELATED APPLICATION

This application is a continuation application that claims the benefit of U.S. patent application Ser. No. 09/742,410 (filed Dec. 22, 2000) (allowed Jan. 28, 2003), now U.S. Pat. No. 6,564,298, which application is incorporated herein in its entirety.

BACKGROUND

The present invention relates to an instruction synchronization scheme in a processing agent.

Instruction decoding can involve many different processes. For the purposes of this discussion, two different processes shall be distinguished from one another. "Instruction synchronization" refers to the act of identifying the locations of instructions within a string of instruction data. As is known, many processors operate upon variable-length instructions. The length of instructions from the Intel x86 instruction set, for example, may be from one to fifteen bytes. The instructions are often byte-aligned within a memory. A processor typically determines the location at which a first instruction begins and determines the location of other instructions iteratively, by determining the length of a current instruction and identifying the start of a subsequent instruction at the next byte following the conclusion of the current instruction. Within the processor, a "pre-decoder" may perform instruction synchronization. All other decoding operations, such as decoding of instruction type, registers and immediate values from instruction data, shall be referred to as "decoding" herein, to be performed by a "decoder."

FIG. 1 is a block diagram illustrating the process of program execution in a conventional processor. Program execution may include three stages: front end 110, execution 120 and memory 130. The front-end stage 110 performs instruction pre-processing. Front end processing is designed with the goal of supplying valid decoded instructions to an execution core with low latency and high bandwidth. Front-end processing can include instruction synchronization, decoding, branch prediction and renaming. As the name implies, the execution stage 120 performs instruction execution. The execution stage 120 typically communicates with a memory 130 to operate upon data stored therein.

Instruction synchronization is known per se. Typically, instruction synchronization is performed when instruction data is stored a memory in the front-end stage. Given an instruction pointer ("IP"), the front-end stage 110 may retrieve a predetermined length of data (called a "chunk" herein) that contains the instruction referenced by the IP. The instruction itself may be located at any position within the chunk. Instruction synchronization examines all data from the location of the referenced instruction to the end of the chunk and identifies instructions therein. When the chunk is stored in a memory in the front-end stage, instruction markers also may be stored in the memory to identify the position of the instructions for later use.

Prior instruction synchronization schemes suffer from some performance drawbacks. First, instruction synchronization adds latency because the process must be performed on all data from the requested instruction to the end of the chunk before the requested instruction may be used otherwise. The requested instruction is available to the execution stage 120 only after the delay introduced by the synchronization process. Second, instructions in a partially synchronized chunk may not be available even though they may be present in the front-end memory. A front-end memory may not hit on a request for an instruction in a non-synchronized portion of such a chunk. In response, although the front-end memory may store the requested instruction, the front end 110 may cause the chunk to be re-retrieved from another source and may perform instruction synchronization upon it.

Accordingly, there is a need in the art for an instruction synchronization scheme that avoids, unnecessary latency in the synchronization process.

BRIEF DESCRIPTION OF THE DRAWINGS

FIG. 1 is a block diagram illustrating the process of program execution in a conventional processor.

FIG. 2 is a block diagram of a front end processing system according to an embodiment of the present invention.

FIG. 3 illustrates a method of operation according to an embodiment of the present invention.

FIG. 4 illustrates a cache entry architecture according to an embodiment of the present invention.

FIG. 5 illustrates a cache entry structure according to another embodiment of the present invention.

DETAILED DESCRIPTION

Figure 6:
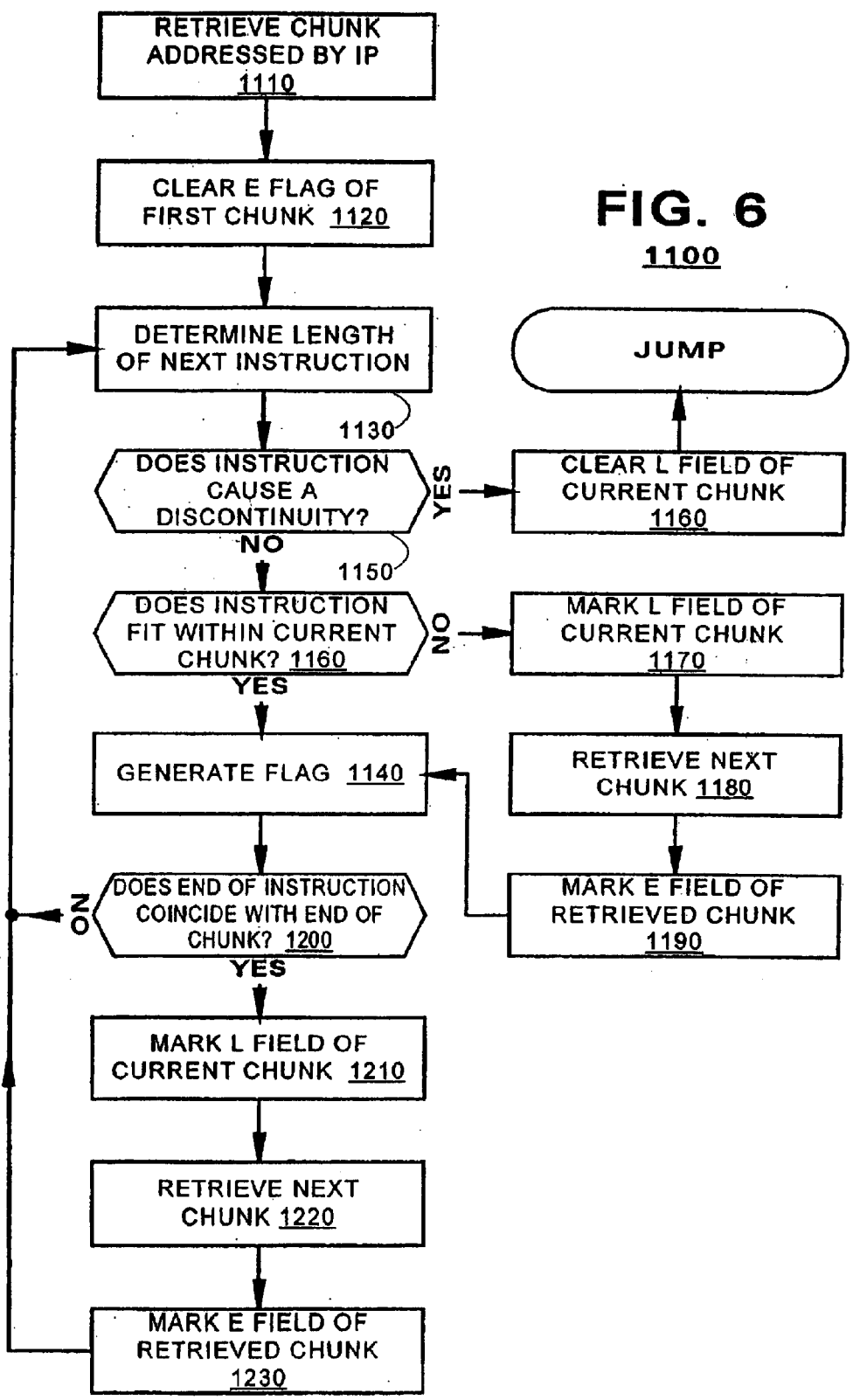
FIG. 6 is a flow diagram of a pre-decoding method according to an embodiment of the present invention.

Embodiments of the present invention provide a pre-decoder in a front-end system provided between an instruction cache and a decoder. The front-end system may toggle between two modes of operation. In a first mode, called the "fast mode" the front-end system retrieves pre-decoded instructions from the instruction cache and decodes them directly. In a second mode, called the "marking mode," the front-end system retrieves data from the instruction cache and synchronizes to them prior to decoding. Synchronization results may be stored back in the instruction cache for later use.

FIG. 2 is a block diagram of a front end processing system 200 according to an embodiment of the present invention. The front end 200 may include an instruction cache system ("ICS") 210 and an instruction segment system ("ISS") 220. The instruction cache system 210 may include an instruction cache (or memory) 230, a branch prediction unit ("BPU") 240, a pre-decoder 250 and an instruction decoder 260. The instruction cache 230 may store instruction data, indexed by an instruction pointer (or "IP"). The pre-decoder. 250 may perform instruction synchronization functions described above. The decoder 260 may perform other decoding functions on instruction data.

The front-end system 200 may include two communication paths 232, 234 extending from the instruction cache 230 to the instruction decoder 260. A first path 232 extends directly from the cache 230 to the instruction decoder 260 via a selection switch 270. A second path extends from the instruction cache 230 to the pre-decoder 250 and further to the instruction decoder 260, also via the selection switch 270. The selection switch 270 may be controlled by a hit/miss signal generated by the instruction cache 230.

Decoded instructions output from the decoder 260 may be output to the execution unit 120 (FIG. 1).

FIG. 2 illustrates the front end system 200 integrated with an ISS 220. Decoded 12 instructions output from the decoder 260 also may be input to the ISS 220. The ISS 220 may build and store instruction segments—traces, extended blocks or other logical units of program instructions—based on the output of the decoder 260. Thus, the ISS 220 may output previously stored instructions from these instruction segments to the selector 280 along a second path. The selector 280 may output instructions from one of its two input paths according to a control signal from the ISS 220 (not shown).

As the two paths imply, the ICS 210 may operate according to multiple modes of operation. In a first mode, called the "fast mode," instructions retrieved from the instruction cache 230 may be output directly to the decoder 260. In a second mode, called the "mark mode," instructions retrieved from the instruction cache 230 may be made subject to instruction synchronization by the pre-decoder 250. The pre-decoder 250 examines data output from the instruction cache 230 and, using the IP of the requested instruction as a reference point, determines the location of each instruction extending from the location of the IP within the chunk to the chunk's end. The results of the synchronization process may be written back to the instruction cache for later use.

According to an embodiment, the pre-decoder 250 may generate flags to identify the location of instructions within a chunk. Several alternatives are possible. In a first embodiment, the flags may signify the beginning of an instruction. Alternatively, the flags may signify the end of an instruction. Regardless of which embodiment is used, the front-end system 200 may determine the location of the beginning of each instruction; if the flags signify the endpoints of instructions, the beginning of the next instruction may be found in the next byte adjacent to the end of the prior instruction.

According to an embodiment, the instruction cache 230 may include a marker system to identify the position of instructions within the cache. Instruction data may be stored in the instruction cache 230 in cache entries (not shown). A marker field may be provided for each cache entry for storage of synchronization flags identifying instruction origins or terminations within the cache entry. For a cache entry having a width of N bytes, the marker field may have at least N flags, one flag provided for each byte. Beginning-of-instruction flags or end-of-instruction flags generated by the pre-decoder 250 may be stored in the marker field of the instruction cache 210. The flags may be as simple as one-bit flags, in an embodiment.

Alternate embodiments permit additional flags to be integrated into the marker field to provide enhanced functionality. For example, one or more flags may be provided to:
   identify beginning-of-instructions or end-of-instructions at terminal ends of the cache entry,
   identify a decoding mode to which the other synchronization flags apply, or
   identify instruction continuity among multiple cache lines.
These enhancements, described in greater detail below, may be applied independently of each other.

FIG. 3 illustrates a method of operation 1000 according to an embodiment of the present invention. When an IP hits the instruction cache (box 1010), the cache may read out the marker field associated with the cache entry that caused the hit (box 1020). If the marker field indicates that the byte referenced by the IP is the start of an instruction (box 1030), it may indicate that instruction synchronization has been performed previously. In this case, the system may enter the fast mode (box 1040). Referring to FIG. 2, in the fast mode, the instructions output from the instruction cache 230 may be output directly to the decoder 260 via the selection switch 270, bypassing the pre-decoder 250.

If the marker field does not indicate that the referenced byte is the start of an instruction, the system may enter the marking mode (box 1050). In this instance, again with reference to FIG. 2, instructions in the marking mode may be output from the instruction cache 230 to the pre-decoder 250 for synchronization. The pre-decoder 250 may output synchronized instructions to the decoder 260 and may output marking flags to the instruction cache 230 (box 1060). The marking flags may be stored in the marking field associated with the data line that caused the hit at box 1010.

FIG. 4 illustrates a cache entry 300 architecture according to an embodiment of the present invention. A cache entry 300 may include a data line 310 and a marker field 320. The data line 310 may have a width sufficient to store a chunk of data, denoted herein as N bytes in width. A first field 330 of the marker field 320 may store the N synchronization flags corresponding to byte locations within the data line 310. In a first embodiment, the synchronization flags 330 may be placed in positions to represent instruction start points within the data line 310. Alternatively, the synchronization flags may represent instruction end points. Of course, with either embodiment, it is possible for the front end system to determine both start points and end points for each instruction. Given the end point of a first instruction, for example, the start point of a subsequent instruction is located in the next adjacent byte position. Herein, the synchronization flags 330 shall be labeled "Type I" flags.

According to an embodiment, the marker field 320 also may include an $N+1^{st}$ synchronization flag 340. This flag 340 may be of a second type, called a "Type II" flag. In an embodiment where the Type I flags 330 signify instruction end points, the Type II flag 340 may signify an instruction start point. Conversely, when a Type I flag 330 represents an instruction start point, the Type II flag 340 may represent an instruction end point. This $N+1^{st}$ synchronization flag 340 permits instruction synchronization integrity checks to be made using only a single marker field 320.

The significance of the Type II flag 340 may be best understood with reference to an example. Consider an example where a marker field 320 included only Type I synchronization flags 330 representing instruction end points. In this hypothetical example, the marker field 320 does not include a Type II flag 340. When reading data from the instruction cache 230 (FIG. 2) in fast mode, instruction start points may be derived from the Type I flags for all byte positions in the cache line 310 except the first byte position. The Type I flag for the first byte position identifies whether an instruction ends at that position but no flag provides information from which to determine whether an instruction starts at that position. The Type II flag 340 may be provided to identify whether an instruction start point occurs at the first position.

Accordingly, in a system where Type I flags 330 represent instruction endpoints, a Type II flag 340 may be provided in association with the first byte position of the data line 310 to identify an instruction start point at that position. In an alternate embodiment, where Type I flags 330 represent instruction start points, a Type II flag 340 may be provided in association with a last byte position of the data line 310 to identify an instruction endpoint at that position. In both of these embodiments, the marker field 320 may have N+1 flags.

FIG. 5 illustrates a cache entry structure 400 according to another embodiment of the present invention. A cache entry 400 may include a data line 410 and a marker field 420 having at least N synchronization flags 430. In this embodiment, the marker field may include two additional flags 440, 450, labeled the E flag and L flag respectively. These two flags are continuity flags; they determine whether instruction flow may "enter" the cache entry 400 or "leave" the cache entry in fast mode.

As is known, program flow normally advances across adjacent instructions unless an instruction causes a jump to another instruction at some discontinuous address. Thus, instructions can be expected to advance serially across multiple cache entries 400, 460, 470 until a jump instruction (or the like) is encountered. According to an embodiment, when instruction synchronization is performed from a first cache entry 400 to a second cache entry 460, the L flag 450 in the first cache entry 400 may be enabled to signify that instruction flow may "leave" the cache entry 400 to the next cache entry 460. Similarly, when instruction synchronization "enters" the second cache entry 460 from the first cache entry 400, the E flag 480 in the second entry may be set. The E flag 440 in the first cache entry 400 would not be set unless instruction flow entered the cache entry 400 from an earlier adjacent cache line (not shown). The E and L flags 440, 450 permit a pre-decoder 250 to determine whether data from multiple adjacent cache belongs to a unitary sequence of instruction.

Thus, the E flag 440 indicates instruction synchronization continuity with an adjacent cache entry in a first direction in the instruction cache 230 (FIG. 2). The L flag 450 indicates instruction synchronization continuity with an adjacent cache entry in a second direction in the instruction cache 230.

FIG. 6 is a flow diagram of a pre-decoding method 1100 according to an embodiment of the present invention. The method may be used in the marking mode. The method 110 may begin when instruction flow jumps to a predetermined IP (box 1110). The IP identifies not only the cache entry 400 (FIG. 5) in which a next instruction may be retrieved but also a byte position within the entry where the instruction begins. The E flag may be cleared in the cache entry referenced by the IP (box 1120). Thereafter, instruction synchronization may occur on data within the cache entry according to normal processes. As noted, instruction synchronization typically involves examining the length of an instruction and marking a flag to represent a breakpoint between instructions (boxes 1130, 1140). The present embodiment of the pre-decoding method 1100 does not interrupt this process. Instead, it augments the process to include the E and L flags described above.

If an instruction causes a discontinuity by transferring instruction flow to a new IP, such as by a jump (box 1150), the pre-decoder 250 may clear the L flag of the cache entry currently being marked (box 1160). Thereafter, the process may jump to the new IP.

An instruction can span across two cache entries. When this occurs (box 1160), the method 1100 may mark the L flag of the current chunk (box 1170). It may retrieve the next adjacent chunk and may mark the E flag of the new chunk (boxes 1180–1190). Thereafter, the method may return to the instruction synchronization process (boxes 1140, 1130).

The endpoint of an instruction also may coincide with the end of a cache entry. After a flag is generated (box 1140), if the endpoint of the instruction coincides with the end of the cache entry (box 1200), the method may mark the L field of the current chunk (box 1210). It may retrieve the next adjacent chunk and may mark the E flag of the new chunk (boxes 1220–1230). Thereafter, the method may return to the instruction synchronization process (boxes 1130–1140).

Returning to FIG. 5, use of the E and L flags provides an architecture in which data from multiple cache lines may be designated as being part of a continuous sequence of instruction data for synchronization purposes. FIG. 5 illustrates an example in which three cache entries 400, 460, 470 are part of a continuous sequence of instruction data corresponding to chunks located at addresses A, A+1 and A+2 respectively. Following instruction synchronization, the L fields of cache entries 400 and 460 would be marked and the E fields of cache entries 460 and 470 would be marked. If instruction flow returned to cache entry 400 and hit, the system may enter the fast mode and output the contents of these three cache entries directly to the decoder 260 (FIG. 2).

If, however, chunk A+1 were evicted and cache entry 460 were overwritten with instruction data from another source, the E and L flags in cache entry 460 would be cleared. Thereafter, if instruction flow returned to cache entry 400 and hit, the contents of cache entry 400 could be output to the decoder 260 in the fast mode. When the E flag 480 from cache entry 460 were retrieved, however, it would cause the system to abort the fast mode because it is cleared. Thus, examination of the E and L flags can signal discontinuities in instruction flow in an embodiment.

Figure 7:
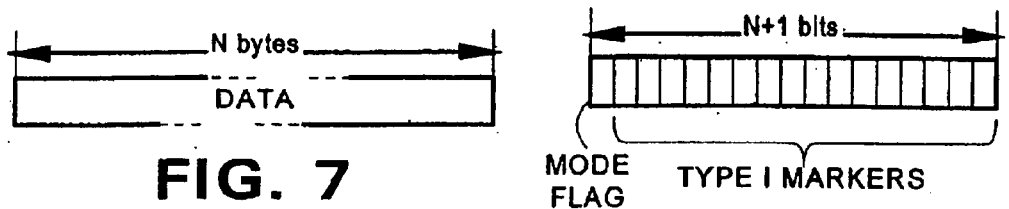
FIG. 7 illustrates another embodiment of a cache entry.

FIG. 7 illustrates another embodiment of a cache entry 500. The cache entry 500 may include a data line 510 and a marker field 520 having a field 530 of synchronization flags. Additionally, the marker field 520 may include a mode flag 540. As is known, many processors may operate on instructions in one or more decoding mode. For example, the Pentium Pro® processor, commercially available from Intel Corporation of Santa Clara, Calif., may operate on instructions in a 16-bit mode and a 32-bit mode. A mode flag 540 may identify which of the decoding modes govern instruction synchronization results stored in a cache entry 500. Of course, in an embodiment, a mode flag may be a multi-bit value to distinguish among more than two different coding modes.

Figure 8:
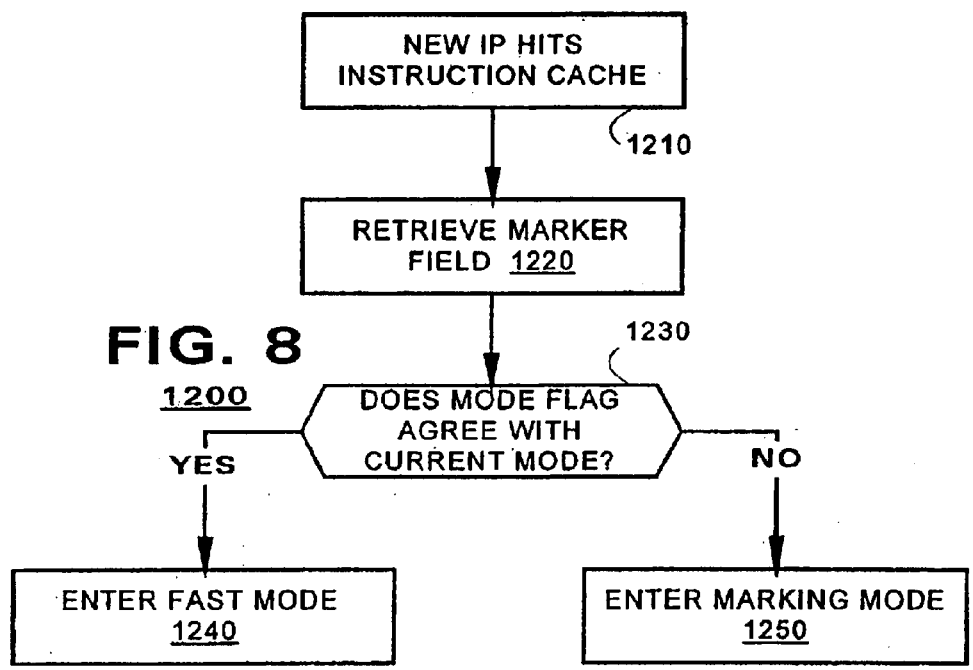
FIG. 8 is a flow diagram of a method of operation of a system in accordance with another embodiment of the present invention.

FIG. 8 is a flow diagram of a method of operation 1200 of a system in accordance with another embodiment of the present invention. In this embodiment, when an IP hits a cache entry within the instruction cache 230 (FIG. 2), the corresponding marker field may be retrieved (boxes 1210–1220). The mode flag may be compared against a current mode of operation (box 1230). If the mode flag agrees with the current mode, then the system may enter the fast mode (box 1240). Otherwise, the system may enter the marking mode (box 1250); data in the cache entry 700 (FIG. 7) may be fed to the pre-decoder 250 (FIG. 2) for instruction synchronization.

Although the foregoing embodiments have been described as independent embodiments, they of course may integrated into a unitary solution in a front-end system 200 (FIG. 2). In an integrated embodiment, several triggering events may cause a front end system 200 to change from fast mode to marking mode or vice versa. A transition may be made to marking mode when any of the following events occur:

a mode bit differs from a current decoding mode;
instruction flow jumps to a new IP which has not been identified by a synchronization flag as the beginning of an instruction;
when entering a new chunk from an old chunk, the E flag of the new chunk is cleared; and
when concluding synchronization at the end of a chunk and the L flag is cleared.

In the integrated embodiment, a transition to fast mode may occur when instruction flow jumps to a new IP, the IP is designated at the beginning of a new instruction and the mode bit agrees with a current decoding mode.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A system, comprising:
    an instruction cache,
    an instruction pre-decoder, and
    an instruction decoder coupled to the instruction cache by a pair of input communication paths, one input communication path bypassing the instruction pre-decoder and another input communication path passing through the instruction pre-decoder.

2. The system of claim 1, further comprising a path selector, having a control input coupled to the instruction cache, the pair of communication paths each passing through the path selector.

3. The system of claim 1, wherein the instruction cache comprises a plurality of cache entries, the cache entries comprising a data line having a predetermined length of bytes and a marker field having a flag position for each byte in the data line.

4. The system of claim 1, where the flag positions are to store flags of a first type and the marker field further comprises an additional flag position to store a flag of a second type.

5. The system of claim 4, wherein the flags of the first type signify instruction start points and the flag of the second type signifies an instruction end point.

6. The system of claim 4, wherein the flags of the first type signify instruction end points and the flag of the second type signifies an instruction start point.

7. The system of claim 3, wherein the marker field further comprises an additional flag position for a mode flag.

8. The system of claim 3, wherein the marker field further comprises first and second additional flag positions, the first additional flag position to store a continuity flag referring to an adjacent cache line in a first direction, the second additional flag position to store a continuity flag referring to a second adjacent cache line in a second direction.

9. The system of claim 1, further comprising a selection switch, each of the communication paths coupled to a respective input of the selection switch, the instruction decoder coupled to an output of the selection switch.

10. A cache, comprising a plurality of cache entries to store data, each entry including flag positions to store a pair of flags, a first flag to signify that data in the respective entry is continuous with data in a preceding cache entry and a second flag to signify that data in the respective entry is continuous with data in a next cache entry.

11. The cache of claim 10, wherein a cache entry further comprises a marker field to store boundary flags for each byte in the data line, each boundary flag to indicate an instruction boundary occurring at the corresponding byte position in the data line.

12. The cache of claim 11, wherein the boundary flags indicate instruction end points.

13. The cache of claim 11, wherein the boundary flags indicate instruction start points.

14. The cache of claim 11, wherein the marker field includes at least one more boundary flags than the number of bytes in the data line.

15. The cache of claim 11, wherein the marker field further comprises an additional flag position for a mode flag to indicate a decoding mode applicable to data in the respective cache entry.

16. An apparatus comprising:
    an instruction cache,
    an instruction pre-decoder coupled to the instruction cache, and
    an instruction decoder to receive data from the instruction cache by a first communication path and from the instruction pre-decoder by a second communication path.

17. The apparatus of claim 16, wherein the instruction cache comprises a plurality of cache entries, the cache entries comprising a data line having a predetermined length of bytes and a marker field having a flag position for each byte in the data line.

18. The apparatus of claim 17, where the flag positions are to store flags of a first type and the marker field further comprises an additional flag position to store a flag of a second type.

19. The apparatus of claim 18, wherein the flags of the first type signify instruction start points and the flag of the second type signifies an instruction end point.

20. The apparatus of claim 18, wherein the flags of the first type signify instruction end points and the flag of the second type signifies an instruction start point.

21. The apparatus of claim 17, wherein the marker field further comprises an additional flag position for a mode flag.

22. The apparatus of claim 17, wherein the marker field further comprises first and second additional flag positions, the first additional flag position to store a continuity flag referring to an adjacent cache line in a first direction, the second additional flag position to store a continuity flag referring to a second adjacent cache line in a second direction.

23. The apparatus of claim 16, further comprising a selection switch, the first and second communication paths each coupled to a respective input of the selection switch, the instruction decoder coupled to an output of the selection switch.

24. A method, comprising:
    retrieving a marker field identified by an address of a requested instruction,
    if the marker field does not indicate that an instruction starts at a cache location identified by the address, performing instruction synchronization on instruction data stored at the cache location,
    otherwise, decoding the instruction data.

25. The method of claim 24, further comprising decoding instructions identified by the instruction synchronization.

26. The method of claim 24, further comprising writing synchronization flags generated by the instruction synchronization to the instruction cache.

27. The method of claim 24, further comprising, if the marker field indicates that an instruction starts at the location identified by the instruction pointer
    comparing a mode flag from the marker field to a current mode of operation, and
    if the mode flag disagrees with the current mode, performing instruction synchronization on instruction data at the location.

28. A method comprising:
    retrieving instructions from a cache;
    in a fast mode of operation, decoding the retrieved instructions;

in a marking mode of operation:
  performing instruction synchronization on the retrieved instructions, and
  decoding instructions identified by the instruction synchronization; and
  transitioning to the marking mode when instruction flow jumps to a cache location for which a synchronization field associated with the cache location indicates that the location is not an instruction start point.

29. The method of claim 28, further comprising transitioning to the marking mode when a mode bit in the synchronization field differs from a current decoding mode.

30. The method of claim 28, further comprising transitioning to the marking mode when instruction flow enters a new cache entry and a flag in the new cache entry indicates a lack of continuity with an adjacent cache entry.

31. The method of claim 28, further comprising transitioning to the marking mode when instruction flow reaches an end of a current cache entry and a flag therein indicates a lack of continuity with a next cache entry.

32. The method of claim 28, further comprising transitioning to the fast mode when instruction flow jumps to a location within a new cache entry and a synchronization field associated with the new cache entry indicates that the location is an instruction start point.

33. The method of claim 28, further comprising transitioning to the fast mode when instruction flow jumps to a second location referenced by a new instruction pointer, a second synchronization field associated with the second location indicates that the second location is an instruction start point and a mode bit associated with the second location agrees with a current decoding mode.

34. An instruction retrieval method, comprising:
  after an instruction address hits an instruction cache, outputting a data unit from the instruction cache,
  after a location within the data unit referenced by the instruction address has been marked previously as a starting point of a variable length instruction, outputting the data unit directly to an instruction decoder, and
  after the location has not been marked previously as a starting point of a variable length instruction, performing instruction synchronization upon the data unit.

35. The instruction retrieval method of claim 34, wherein the instruction synchronization identifies starting points of variable length instructions within the data unit.

36. The instruction retrieval method of claim 35, further comprising storing markings of the starting points in the instruction cache in association with the data unit.

37. The instruction retrieval method of claim 34, further comprising, responsive to a determination that a continuity flag in the data unit is set to a predetermined condition, retrieving a next data unit from the instruction cache.

38. The instruction retrieval method of claim 37, further comprising, responsive to a state of a continuity flag in the next data unit, forwarding the next data unit directly to the instruction decoder.

39. The instruction retrieval method of claim 37, further comprising, responsive to a second state of the continuity flag in the next data unit, performing instruction synchronization upon the next data unit.

\* \* \* \* \*